(12) United States Patent
Komiyama et al.

(10) Patent No.: US 10,220,298 B2
(45) Date of Patent: Mar. 5, 2019

(54) CHOPSTICKS HANDLING GAME DEVICE AND GAMING METHOD

(71) Applicant: Komy Co., Ltd., Saitama (JP)

(72) Inventors: Sakae Komiyama, Saitama (JP); Toshiyasu Tamura, Saitama (JP)

(73) Assignee: KOMY CO., LTD, Kawaguchi, Saitama (JP)

( * ) Notice: Subject to any disclaimer, the term of this patent is extended or adjusted under 35 U.S.C. 154(b) by 0 days.

(21) Appl. No.: 15/786,875

(22) Filed: Oct. 18, 2017

(65) Prior Publication Data
US 2018/0117454 A1    May 3, 2018

(30) Foreign Application Priority Data
Oct. 31, 2016    (JP) .................. 2016-212809

(51) Int. Cl.
| A63B 63/00 | (2006.01) |
| A63F 3/00 | (2006.01) |
| A63F 9/00 | (2006.01) |
| A63F 9/30 | (2006.01) |
| G09B 19/24 | (2006.01) |
| A63H 33/00 | (2006.01) |

(52) U.S. Cl.
CPC ............ *A63F 3/00697* (2013.01); *A63F 3/00* (2013.01); *A63F 3/00895* (2013.01); *A63F 9/001* (2013.01); *A63F 9/30* (2013.01); *A63H 33/006* (2013.01); *G09B 19/24* (2013.01); *A63F 2009/0049* (2013.01)

(58) Field of Classification Search
CPC .... A63F 9/00; A63F 9/09; A63F 2003/00801; A63F 2003/00908

USPC .......................... 273/445, 446, 447
See application file for complete search history.

(56) References Cited

U.S. PATENT DOCUMENTS

| 2,896,950 | A | * | 7/1959 | Rosti .................. | A63F 3/00176 273/258 |
| 2,985,451 | A | * | 5/1961 | Sims ..................... | A63F 9/00 273/446 |
| 3,458,198 | A | * | 7/1969 | Scaduto ............. | A63F 3/00006 273/258 |

(Continued)

FOREIGN PATENT DOCUMENTS

| JP | 3134125 U | 8/2007 |
| JP | 2010-194281 A | 9/2010 |

*Primary Examiner* — Melba Bumgarner
*Assistant Examiner* — Joseph B Baldori
(74) *Attorney, Agent, or Firm* — Foley & Lardner LLP

(57) ABSTRACT

Provided are a chopsticks handling game device capable of supporting not only the pinching of objects of various sizes but also a stabbing and cutting operation using the chopstick tips and a gaming method using the same. The chopsticks handling game device of the present invention includes a combination of a pair of chopsticks and a plurality of rings having different outside diameters, wherein the plurality of rings can be concentrically arranged in accordance with the size of the outside diameter. The gaming method of the present invention comprises lifting rings by pinching the outer circumferential sides of concentrically arranged rings with the tips of a pair of chopsticks sequentially from the outermost ring to the innermost ring and concentrically rearranging the rings in an adjacent position.

8 Claims, 4 Drawing Sheets

(56) References Cited

U.S. PATENT DOCUMENTS

| | | | | |
|---|---|---|---|---|
| 3,479,751 A * | 11/1969 | Welbourn | ............... | A63F 9/10 |
| | | | | 273/153 R |
| 3,717,341 A * | 2/1973 | Blanton, Jr. | ........ | A63F 3/00895 |
| | | | | 273/242 |
| 3,958,806 A * | 5/1976 | Brown | ............... | A63B 63/06 |
| | | | | 273/317.3 |
| 4,043,561 A * | 8/1977 | Stepansky | ............ | A63F 9/0073 |
| | | | | 273/153 P |
| 4,437,668 A * | 3/1984 | Simpson | ............... | A63F 9/12 |
| | | | | 206/499 |
| 4,512,584 A * | 4/1985 | Propsom | ............ | A63F 3/00574 |
| | | | | 273/282.1 |
| 4,783,092 A * | 11/1988 | Kandal | ............... | A63B 67/10 |
| | | | | 273/412 |
| 5,028,047 A * | 7/1991 | Lee | ............... | A63F 9/30 |
| | | | | 273/447 |
| 5,040,789 A * | 8/1991 | House | ............... | A63F 9/30 |
| | | | | 273/447 |
| 5,286,026 A * | 2/1994 | Schnapp | ............... | A63F 9/0811 |
| | | | | 273/155 |
| 5,458,342 A * | 10/1995 | Hernandez | ............... | A63F 9/30 |
| | | | | 273/447 |
| 5,560,605 A * | 10/1996 | Garcia | ............... | A63F 9/0073 |
| | | | | 273/153 P |
| 6,394,455 B1 * | 5/2002 | Denoual | ............ | A63F 3/00094 |
| | | | | 273/261 |
| 7,566,057 B2 * | 7/2009 | Mascolo | ............... | A63F 9/0073 |
| | | | | 273/153 J |
| 2011/0074109 A1 * | 3/2011 | Werth | ............... | A63B 65/122 |
| | | | | 273/336 |
| 2012/0225739 A1 * | 9/2012 | Cheshire | ............... | A63B 63/06 |
| | | | | 473/416 |

\* cited by examiner

CHOPSTICKS HANDLING GAME DEVICE AND GAMING METHOD

CROSS-REFERENCE TO RELATED APPLICATIONS

This application claims priority from Japanese application JP 2016-212809, filed Oct. 31, 2016.

TECHNICAL FIELD

The present invention relates to a chopsticks handling game device and a gaming method.

BACKGROUND ART

Chopsticks are a tool used to bring food to the mouth. Regarding the use of chopsticks, there are operations such as pinching food with the tips of the chopsticks or stabbing and cutting the food into small pieces. The use of chopsticks in this way (chopsticks handling) is difficult for those using chopsticks for the first time, and it is necessary to have some training. Thus, parents have customarily taught children how to use chopsticks from a young age.

Japanese Utility Model Registration No. 3134125 (Patent Literature 1) and Japanese Unexamined Patent Publication No. 2010-194281 (Patent Literature 2) disclose game devices which enable the training of such chopsticks handling operations in a game-like manner. In both, a large number of objects to be conveyed are stored in a single container, and the objects to be conveyed are transferred one-by-one with the tips of the chopsticks to a different container.

However, since the to-be-conveyed objects of the conventional game devices are of a uniform size, and only pinching and transferring operations are performed in the conventional game devices, they are not able to properly train chopstick specific operations such as conveying objects of various sizes, stabbing and cutting using chopsticks, and the like.

CITATION LIST

Patent Literature

Patent Literature 1: Japanese Utility Model Registration No. 3134125
Patent Literature 2: Japanese Unexamined Patent Publication No. 2010-194281

SUMMARY OF THE INVENTION

Technical Problem

The object of the present invention is to provide a chopsticks handling game device that can support not only the pinching of objects of various sizes but can also support a stabbing and cutting operation using the tips of the chopsticks. A chopsticks handling gaming method using this game device is also provided.

Solution to Problem

The chopsticks handling game device of the present invention comprises a combination of a pair of chopsticks and a plurality of rings having different outside diameters, wherein the plurality of rings can be concentrically arranged in accordance with the size of the outside diameter thereof.

Additionally, the chopsticks handling gaming method of the present invention includes the following three methods.

The chopsticks handling gaming method of the first invention is a gaming method for the use of the chopsticks handling game device, comprising the steps of arranging the plurality of rings concentrically on a planar surface, lifting the concentrically arranged plurality of rings sequentially from the outermost ring to the innermost ring by pinching the outer circumferential side of a ring with the tips of the pair of chopsticks, and rearranging the plurality of rings concentrically in an adjacent position.

The chopsticks handling gaming method of the second invention is a gaming method for the use of the chopsticks handling game device, comprising the steps of arranging the plurality of rings concentrically on a planar surface, lifting the concentrically arranged plurality of rings sequentially from the innermost ring to the outermost ring by pressing and holding the inner circumferential side of a ring with the tips of the pair of chopsticks, and rearranging the plurality of rings concentrically in an adjacent position.

The chopsticks handling gaming method of the third invention is a gaming method for the use of the chopsticks handling game device, comprising the steps of arranging the plurality of rings concentrically on a planar surface, lifting the concentrically arranged plurality of rings sequentially from the outermost ring to the innermost ring or from the innermost ring to the outermost ring by pinching the radial thickness portion of a ring with the tips of the pair of chopsticks, and rearranging the plurality of rings concentrically in an adjacent position.

The present invention includes the following embodiments.

[1] A chopsticks handling game device comprising a combination of a pair of chopsticks and a plurality of rings having different outside diameters, wherein the plurality of rings can be concentrically arranged in accordance with the size of the outside diameters thereof.

[2] The chopsticks handling game device according to [1], wherein tips of the pair of chopsticks are covered with an elastic material.

[3] The chopsticks handling game device according to [1] or [2], wherein the outer peripheral surfaces and the inner peripheral surfaces of the rings are processed to have rough surfaces.

[4] The chopsticks handling game device according to any one of [1] to [3], wherein one side surface of the rings is colored different color from the other side surface of the rings.

[5] A gaming method for the use of the chopsticks handling game device according to any one of [1] to [4], comprising the steps of arranging the plurality of rings concentrically on a planar surface, lifting the concentrically arranged plurality of rings sequentially from the outermost ring to the innermost ring by pinching the outer circumferential side of a ring with the tips of the pair of chopsticks, and rearranging the plurality of rings concentrically in an adjacent position.

[6] A gaming method for the use of the chopsticks handling game device according to any one of [1] to [4], comprising the steps of arranging the plurality of rings concentrically on a planar surface, lifting the concentrically arranged plurality of rings sequentially from the innermost ring to the outermost ring by pressing and holding the inner circumferential side of a ring with the tips of the pair of chopsticks, and rearranging the plurality of rings concentrically in an adjacent position.

[7] A gaming method for the use of the chopsticks handling game device according to any one of [1] to [4], comprising the steps of arranging the plurality of rings concentrically on a planar surface, lifting the concentrically arranged plurality of rings sequentially from the outermost ring to the innermost ring or from the innermost ring to the outermost ring by pinching the radial thickness portion of a ring with tips of the pair of chopsticks, and rearranging the plurality of rings concentrically in an adjacent position.

Advantageous Effects of the Invention

Since the objects to be handled by the chopsticks are rings, it is possible to practice pinching food by operations including pinching the outer circumferential sides or the radial thickness part of the rings with tips of the pair of chopsticks. Additionally, it is possible to practice a food cutting operation by pressing and holding the inner circumferential sides of the rings with the tips of the chopsticks which are opened. Moreover, since a plurality of rings having different outside diameters are used, it is also possible to practice for foods of varying sizes. Therefore, it is possible to perform various training operations which cannot be achieved with the conventional game devices.

DESCRIPTION OF EMBODIMENTS

Figure 1:
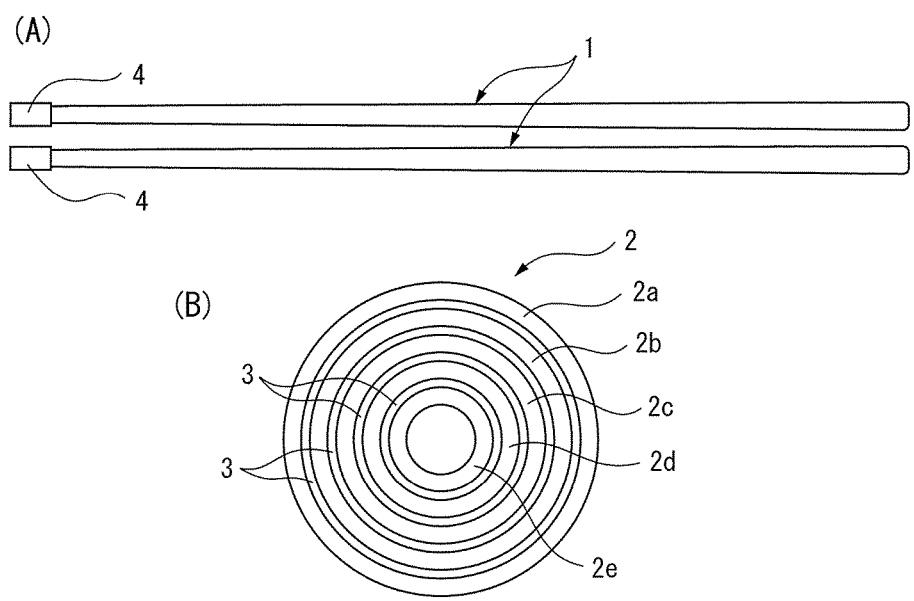
FIGS. 1 (A) and (B) are plan views of the chopsticks handling game device of the present invention.

Hereinafter, the present invention will be described in detail with reference to the drawings, but the present invention is not limited to the embodiments shown in the drawings.

(1) Chopsticks Handling Game Device

Figure 2:
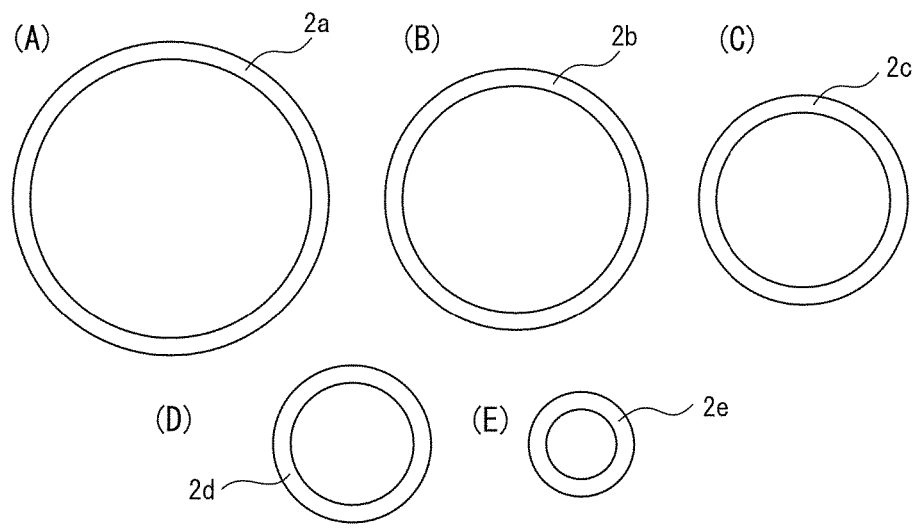
FIGS. 2 (A) to (E) are plan views of individual rings, which are the components of the chopsticks handling game device of the present invention.

FIGS. 1 (A) and (B) show plan views of one example of the chopsticks handling game device of the present invention. FIGS. 2 (A) to (E) are plan views individually showing the plurality of rings, which are the components of the chopsticks handling game device of the present invention.

The chopsticks handling game device of the present invention is composed of a combination of a pair of chopsticks 1 and a ring group 2 consisting of a plurality of rings 2a, 2b, 2c, 2d and 2e.

Any chopsticks which are commonly used for Japanese food may safely be used as the chopsticks 1. The material therefor may be wood, bamboo, plastic, or metal. The tips of the chopsticks 1 may be covered with tubular elastic materials 4 as slip stoppers, as shown in FIG. 1.

The ring group 2 consists of a plurality of rings 2a, 2b, 2c, 2d, and 2e having outside diameters which are different from each other. These plurality of rings 2a, 2b, 2c, 2d, and 2e are arranged such that the ring 2a having the greatest outside diameter is arranged on the outermost side, and rings 2b, 2c, 2d, and 2e having smaller outside diameters are sequentially arranged therein in the form of the annular rings of a tree, i.e., in a concentric manner with an appropriate gap 3 interposed therebetween, as shown in FIG. 1 (B).

Figure 4:
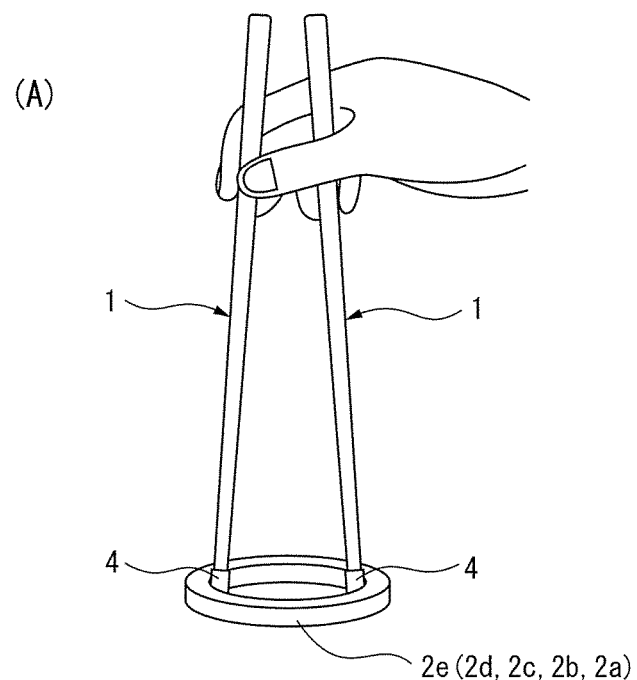
FIGS. 4 (A) and (B) are explanatory views of the chopsticks handling gaming method according to the second invention (method B) of the present invention.
Figure 4:
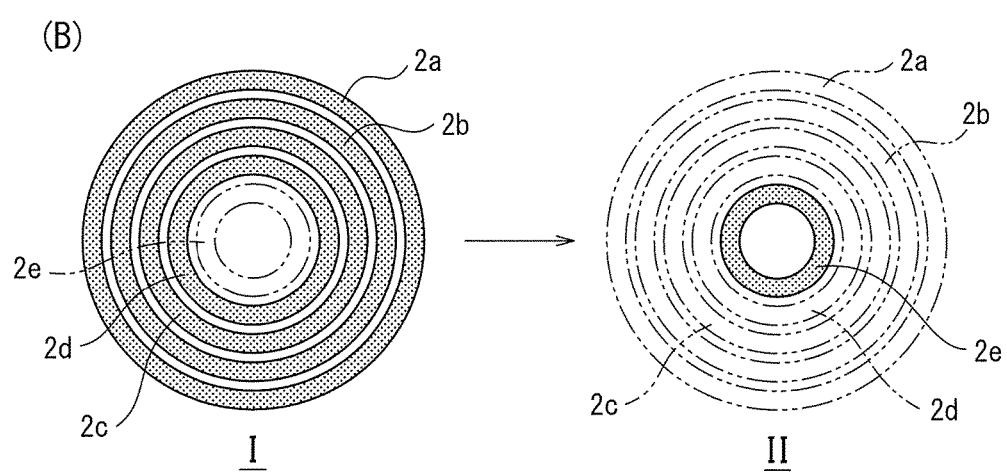
Figure 5:
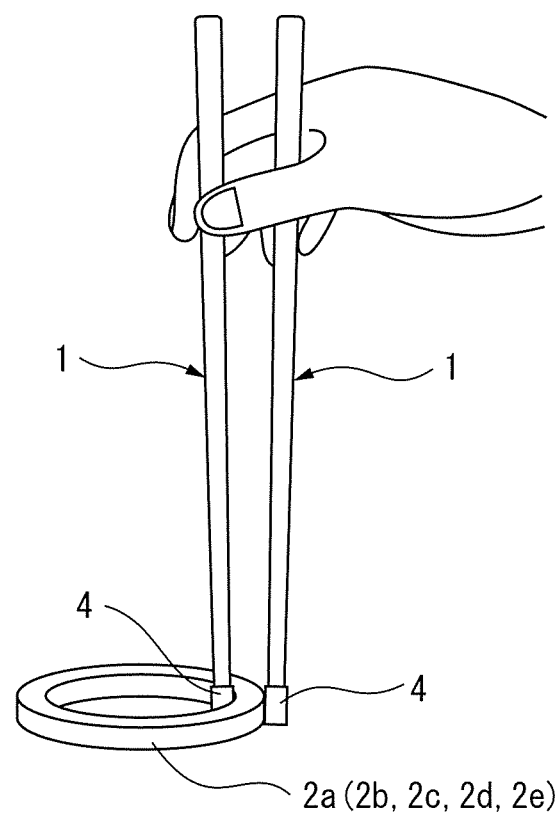
FIG. 5 is an explanatory view of the chopsticks handling gaming method according to the third invention (method C) of the present invention.

The chopsticks 2 can transport each of the plurality of rings 2a, 2b, 2c, 2d and 2e one-by-one by pinching the outer circumferential sides of the rings between the tips of the chopsticks (FIG. 3) or by pinching the radial thickness portions of the rings (FIG. 5). Further, each of the rings 2a, 2b, 2c, 2d and 2e can be held by inserting the tips of the chopsticks into the inner circumferential side of the ring and opening, pressing against the inner circumferential side of the ring (FIG. 4).

As a means of increasing the gripping force and holding force of the tips of the chopsticks 1, it is advisable to cover the tips of the chopsticks with elastic materials 4. Alternatively, the outer circumferential surfaces and the inner circumferential surfaces of the rings 2a, 2b, 2c, 2d and 2e may respectively be subjected to a roughening process so as to enhance the frictional force of the surfaces. The roughening process is not limited to the outer peripheral surface and the inner peripheral surface of the ring, but may be applied to the entire surface of the ring.

Note that the chopsticks handling game device can also be described as a chopsticks handling training device.

Further, the chopsticks handling game device of the present invention can be used not only to improve the chopsticks skill of children, but can also be used for the rehabilitation of people suffering from paralysis, injuries, etc., and for drills for the prevention of the deterioration of physical function for the elderly and the like.

(2) Chopsticks Handling Gaming Method

The chopsticks handling gaming method of the present invention is a gaming method using the chopsticks handling game device described above. By carrying out this gaming method, chopsticks handling operations can be improved in a game-like and enjoyable manner.

The gaming method of the present invention includes method A of the first invention (shown in FIG. 3), method B of the second invention (shown in FIG. 4), and method C of the third invention (shown in FIG. 5), as explained below.

Figure 3:
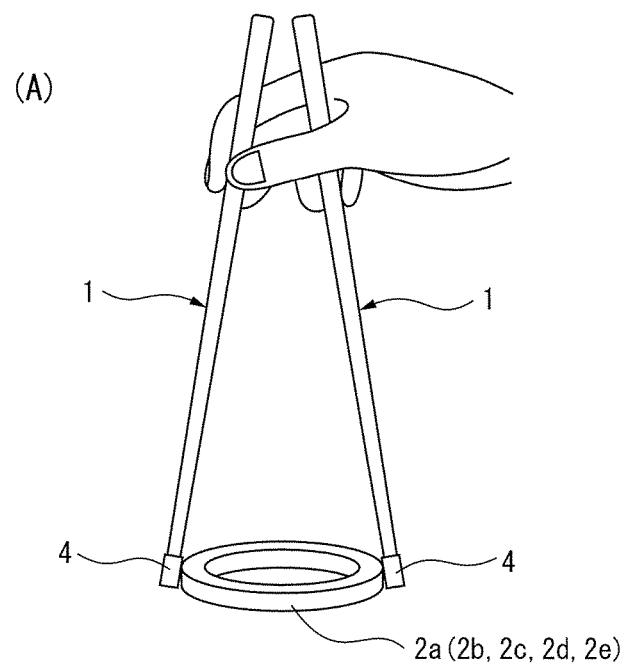
FIGS. 3 (A) and (B) are explanatory views of the chopsticks handling gaming method according to the first invention (method A) of the present invention.
Figure 3:
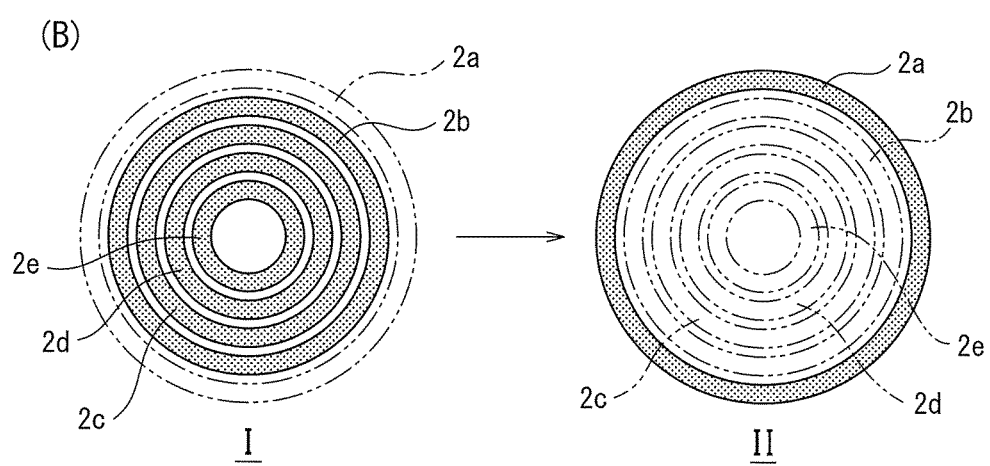

Method A:

Method A is a gaming method in which the plurality of rings 2a, 2b, 2c, 2d and 2e are conveyed one-by-one by pinching the outer circumferential surface of the ring between the tips of the chopsticks 1, as shown in FIG. 3 (A). Since the outside diameters of the plurality of rings vary, chopsticks handling training can be performed for foods of various sizes.

As shown in FIG. 3 (B), in the gaming method of method A, the ring group 2 consisting of the plurality of rings 2a, 2b, 2c, 2d and 2e is first arranged in the form of the annular rings of a tree, i.e., is arranged in a nested concentric manner, on a planar position I of a table or the like. Next, the outermost ring 2a having the largest outside diameter is pinched on the outer peripheral sides thereof between the tips of the chopsticks 1 and is conveyed from the planar position I to an adjacent planar position II.

Next, ring 2b having the second largest outside diameter is conveyed to the adjacent planar position II by the same conveyance operation as above. The conveyed ring 2b is arranged inside the ring 2a which has already been conveyed to the planar position II. Thereafter, the same operation is sequentially repeated for the rings located concentrically inside until ring 2e having the smallest outside diameter has been conveyed such that all of the rings 2a, 2b, 2c, 2d and 2e of ring group 2 have been concentrically rearranged at the adjacent planar position II.

Method B:

Method B is a gaming method in which the plurality of rings 2e, 2d, 2c, 2b and 2a are sequentially conveyed one-by-one by pressing and holding the inner circumferential surface of the ring with the tips of the chopsticks 1, as shown in FIG. 4 (A). Since the inside diameters of the plurality of rings vary, chopsticks handling training for cutting foods of various sizes can be performed.

As shown in FIG. 4 (B), in the gaming method of method B, the ring group 2 consisting of the plurality of rings 2a, 2b, 2c, 2d and 2e is first concentrically arranged on a planar position I. Next, the tips of the chopsticks 1 are inserted into the innermost ring 2e having the smallest outside diameter, and the ring is conveyed from the planar position I to an adjacent planar position II while pressing and holding the inner circumferential surface of the ring with the tips of the chopsticks 1.

Next, the ring 2d having the second smallest inside diameter and which is located concentrically inward is conveyed to the adjacent planar position II by the same conveyance operation as above. The conveyed ring 2d is arranged outside the ring 2e which has already been conveyed to the planar position II. Thereafter, the same operation is sequentially repeated for the rings located concentrically outside until ring 2a having the largest outside diameter has been conveyed such that all of the rings 2e, 2d, 2c, 2b and 2a have been concentrically rearranged at the adjacent planar position II.

Method C:

Method C is a gaming method in which the plurality of rings 2e, 2d, 2c, 2b and 2a are sequentially conveyed one-by-one by pinching the radial thickness portion of the ring between the tips of the chopsticks 1, as shown in FIG. 5.

In the gaming method of method C, the ring group 2 consisting of the plurality of rings 2a, 2b, 2c, 2d and 2e is first concentrically arranged on a planar position I, similarly to method A and method B. However, when conveying from the planar position I to the planar position II, the rings can be conveyed starting from the outermost ring 2a of the concentrically-arranged ring group 2, as in method A, or the rings can be conveyed starting from the innermost ring 2e of the concentrically-arranged ring group 2, as in method B. Either method may be selected.

In the gaming methods A, B, and C described above, when conveying the rings from the planar position I to the planar position II and concentrically rearranging, the front and back sides of the rings may be reversed. Adding such a reversing operation makes the game more interesting. In order to facilitate the judgment that the front and back sides of the rings have been reversed in this manner, it is preferable to color the front side surfaces and the back side surfaces of the rings different colors each other. For example, the front side may be red while the opposite back side is white, or the front side may be blue while the opposite back side is yellow, etc.

In the gaming methods of the present invention, it is advisable to measure how many times method A and/or method B and/or method C have been repeated within a predetermined time period (e.g., one minute) and to compete based on the number of repetitions. As the gaming method, the number of repetitions of method A only, the number of repetitions of method B only, the number of repetitions of method C only, the number of repetitions alternating repeating method A and method B, the number of repetitions alternately repeating method B and method C, the number of repetitions alternately repeating method C and method A, the number of repetitions sequentially repeating method A, method B, and method C, the number of repetitions sequentially repeating method A, method C, and method B, the number of repetitions reversing the front and back sides, etc., may be used individually or several thereof may be combined.

Note that the chopsticks handling gaming method of the present invention can also be described as a method of using the chopsticks handing game device.

(3) Modifiable Embodiments

Any chopsticks which are commonly used for Japanese food may be used. The material may be wood, bamboo, plastic, or metal, but the material is preferably wood or bamboo.

As the material of the rings, plastic, wood, light metal and the like are used, but plastic is particularly preferable. The plastic rings may be manufactured by injection molding, but are preferably cut from a plastic pipe, such as a vinyl chloride pipe. Although the shape of the cross section orthogonal to the circumferential direction of the ring is not particularly limited, it is preferably square or circular.

The number of rings of the ring group constituting the game device is preferably 3 to 6.

As the outside diameter of the rings constituting the ring group, the lower limit of the ring having the smallest outside diameter is preferably 15 mm, and the upper limit of the ring having the largest outside diameter is preferably 65 mm.

It is also preferable that the difference between the adjacent rings in the ring group be such that the difference between the outside diameter of a smaller diameter ring and the inside diameter of a larger diameter ring is 2 to 6 mm. Since the difference between the inside diameter of the larger diameter ring and the outside diameter of the smaller diameter ring is related to the size of the gap 3, it influences the operability when the plurality of rings are concentrically rearranged.

The radial thickness of the rings, that is, the dimension obtained by subtracting the inside diameter from the outside diameter, is preferably 5 to 12 mm. The radial thickness of each ring may be the same for all the rings or may vary. When the thickness in the radial direction is different for each ring, it is preferable to reduce the thickness in the radial direction as the outside diameter of the rings decrease.

The thickness of the rings in the central axis direction (when the cross section orthogonal to the circumferential direction is quadrangular, the dimension between both side surfaces of the ring; when the cross section orthogonal to the circumferential direction is circular, the diameter of the circle) is preferably 5 to 12 mm. The thickness of each ring in the direction of the central axis may be the same for all the rings or may vary.

INDUSTRIAL APPLICABILITY

The chopsticks handling game device of the present invention has commercial value as a tool for practicing chopsticks handling.

The invention claimed is:

1. A gaming method for the use of (a chopsticks handling game device comprising: a pair of chopsticks; and a plurality of rings having different outside diameters, each of the plurality of rings having two opposing side surfaces either of which can be in contact with a planar surface, wherein the plurality of rings can be concentrically arranged in accordance with the size of the outside diameter thereof, the gaming method comprising a first method and a second method, wherein the first method comprises steps of:
arranging the plurality of rings concentrically on a planar surface;
lifting the concentrically arranged plurality of rings sequentially from the outermost ring to the innermost ring by pinching an outer circumferential side of a ring with tips of the pair of chopsticks; and
rearranging the plurality of rings concentrically in an adjacent position; and the second method comprises steps of:
arranging the plurality of rings concentrically on a planar surface;
lifting the concentrically arranged plurality of rings sequentially from the innermost ring to the outermost ring by Dressing and holding an inner circumferential side of a ring with tips of the pair of chopsticks; and
rearranging the plurality of rings concentrically in an adjacent position.

2. The gaming method according to claim 1, further comprising a third method wherein the third method comprises steps of:
arranging the plurality of rings concentrically on a planar surface;
lifting the concentrically arranged plurality of rings sequentially from the outermost ring to the innermost ring or from the innermost ring to the outermost ring by pinching a radial thickness portion of a ring with tips of the pair of chopsticks; and
rearranging the plurality of rings concentrically in an adjacent position.

3. The gaming method according to claim 2, wherein the tips of the pair of chopsticks are covered with an elastic material.

4. The gaming method according to claim 2, wherein outer peripheral surfaces and inner peripheral surfaces of the rings are processed to have rough surfaces.

5. The gaming method according to claim 2, wherein one of the two opposing side surfaces of each of the plurality of rings colored different from a color of the other of the two opposing side surfaces of each of the plurality of rings.

6. The gaming method according to claim 1, wherein the tips of the pair of chopsticks are covered with an elastic material.

7. The gaming method according to claim 1, wherein outer peripheral surfaces and inner peripheral surfaces of the rings are processed to have rough surfaces.

8. The gaming method according to claim 1, wherein one of the two opposing side surfaces of each of the plurality of rings colored different from a color of the other of the two opposing side surfaces of each of the plurality of rings.

* * * * *